United States Patent [19]

Kleinburger et al.

[11] Patent Number: 5,477,095
[45] Date of Patent: Dec. 19, 1995

[54] ROTOR OF A TURBOGENERATOR HAVING DIRECT GAS COOLING OF THE EXCITATION WINDING

[75] Inventors: Johann Kleinburger, Höri; Hans Zimmermann, Mönchaltorf, both of Switzerland

[73] Assignee: ABB Management AG, Baden, Switzerland

[21] Appl. No.: 334,226

[22] Filed: Nov. 4, 1994

[30] Foreign Application Priority Data

Nov. 4, 1993 [DE] Germany .......................... 43 37 628.2

[51] Int. Cl.⁶ ........................................ H02K 3/34
[52] U.S. Cl. .............................. 310/215; 310/42; 310/45; 310/55; 310/214; 310/261
[58] Field of Search ....................... 310/214, 215, 310/261, 60 R, 60 A, 61, 52, 55, 64, 42, 43, 45; 336/196, 198

[56] References Cited

U.S. PATENT DOCUMENTS

| | | |
|---|---|---|
| 1,555,065 | 9/1925 | Lindquist ................... 310/214 |
| 3,119,033 | 1/1964 | Horsley et al. . |
| 3,444,407 | 5/1969 | Yates ......................... 310/215 |
| 4,152,610 | 5/1979 | Wallenstein . |
| 4,634,910 | 1/1987 | Schollhorn . |
| 4,876,469 | 10/1989 | Khutoretsky ............... 310/52 |
| 5,300,844 | 4/1984 | Schuler ...................... 310/215 |

FOREIGN PATENT DOCUMENTS

| | | |
|---|---|---|
| 0173877 | 3/1986 | European Pat. Off. . |
| 439811 | 1/1927 | Germany . |
| 964161 | 5/1957 | Germany . |
| 2742521 | 3/1979 | Germany . |
| 382199 | 5/1973 | U.S.S.R. . |

*Primary Examiner*—R. Skudy
*Attorney, Agent, or Firm*—Oblon, Spivak, McClelland, Maier & Neustadt

[57] ABSTRACT

A rotor of a turbogenerator having direct gas cooling of an excitation winding conductor. An insulating strip is provided between a slot base and the excitation winding conductor. A resiliently elastic intermediate layer, which may be in a form of a corrugated spring, is provided between the insulating strip and the excitation winding conductor in order to compensate for seating phenomena of the excitation winding. This corrugated spring extends in a direction of the rotor body center, originating from the body end. In order to fix this corrugated spring axially without the cross section of the keyway being constricted, the corrugated spring has a pair of projections which point downwards and engage in lateral recesses in the insulating strip.

12 Claims, 4 Drawing Sheets

ROTOR OF A TURBOGENERATOR HAVING DIRECT GAS COOLING OF THE EXCITATION WINDING

BACKGROUND OF THE INVENTION

1. Field of the Invention

The invention relates to a rotor of a turbogenerator having direct gas cooling of the excitation winding, the excitation winding conductors being arranged in longitudinal slots in the rotor body of the rotor and these slots being closed by means of slot wedges, and an insulating strip being provided between the slot base and the excitation winding conductor located above it.

A rotor of this generic type is disclosed, for example, in US-A-4,152,610.

2. Discussion of Background

Different methods for direct cooling of the excitation winding have been developed in the course of time:

a) The cooling gas enters below the winding overhang of the rotor winding and is split in two directions at the start of the rotor body. One part of the cooling gas flows through the winding overhang conductors and leaves the winding overhang area through special openings which are arranged in the pole zone on the rotor body. However, the main part of the airflow enters the excitation winding, which is constructed from hollow conductors, on the body circumference and flows out in the body center (US-A-4,634,910).

b) The cooling gas is passed to the conductors, underneath the excitation winding, along a special channel (keyway or subslot) in the slot. It emerges, seen in the axial direction, at various points (US-A-3,119,033 or US-A-4,152,610).

c) A combination of methods a) and b). In this case, the gas supply for the excitation conductor section is effected in the rotor center by means of keyways or subslots, while the sections at the ends are supplied directly from the winding overhang area.

In all known variants, it is essential for the excitation winding conductors to be securely fixed in the rotor slots, which is normally done by means of slot wedges. In operation, the excitation conductors are pressed against the slot wedges by the centrifugal force effect and are thus also largely secured axially. However, seating phenomena in the event of centrifugal action and in operation lead to loosening in the conductor assembly. This can lead to relative movements occurring between the excitation conductors and the slot or wedge after interruptions in operation, for example in the event of shaft reversal or restarting of the machine. For this reason, resiliently elastic intermediate layers are installed in a prestressed manner between the slot wedge and winding. In the case of rotors without a keyway, resiliently elastic intermediate layers, generally so-called corrugated springs, are also used in the slot base. These intermediate layers must be fixed at at least one point, generally at the rotor body end, in the slot longitudinal direction. While the axial fixing of the resiliently elastic intermediate layers under the slot wedge does not present any problems, the design of the fixing of the intermediate layers on the slot base is more difficult in the case of rotors having a keyway and the corresponding elements must not constrict the cross section of the keyway. Manufacturing reasons and/or strength reasons prohibit the introduction of holes or the like into the slot.

SUMMARY OF THE INVENTION

Accordingly, one object of the invention is to provide a novel rotor of the generic type stated initially, whose excitation winding is secured by simple means against axial relative movements, and the securing means used for this purpose neither adversely affect the strength of the rotor nor impede the flow of the cooling gas.

This object is achieved according to the invention in that a resiliently elastic intermediate layer in the form of a parallel strip is provided between the insulating strip and the excitation winding conductor, which intermediate layer extends in the direction of the rotor body center, originating from the body end, and in that the resiliently elastic intermediate layer has a pair of projections which point downwards and engage in lateral recesses in the insulating strip.

The advantage of the invention can be seen especially in the fact that axial fixing of the resiliently elastic intermediate layer can be achieved using simple means, which fixing withstands all operating stresses, can be produced economically and does not adversely affect the cooling gas paths. It can be used for rotors having very different cooling methods, but is especially suitable for rotors having a keyway.

Exemplary embodiments of the invention and the advantages which can be achieved thereby are explained in the following text with reference to the drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
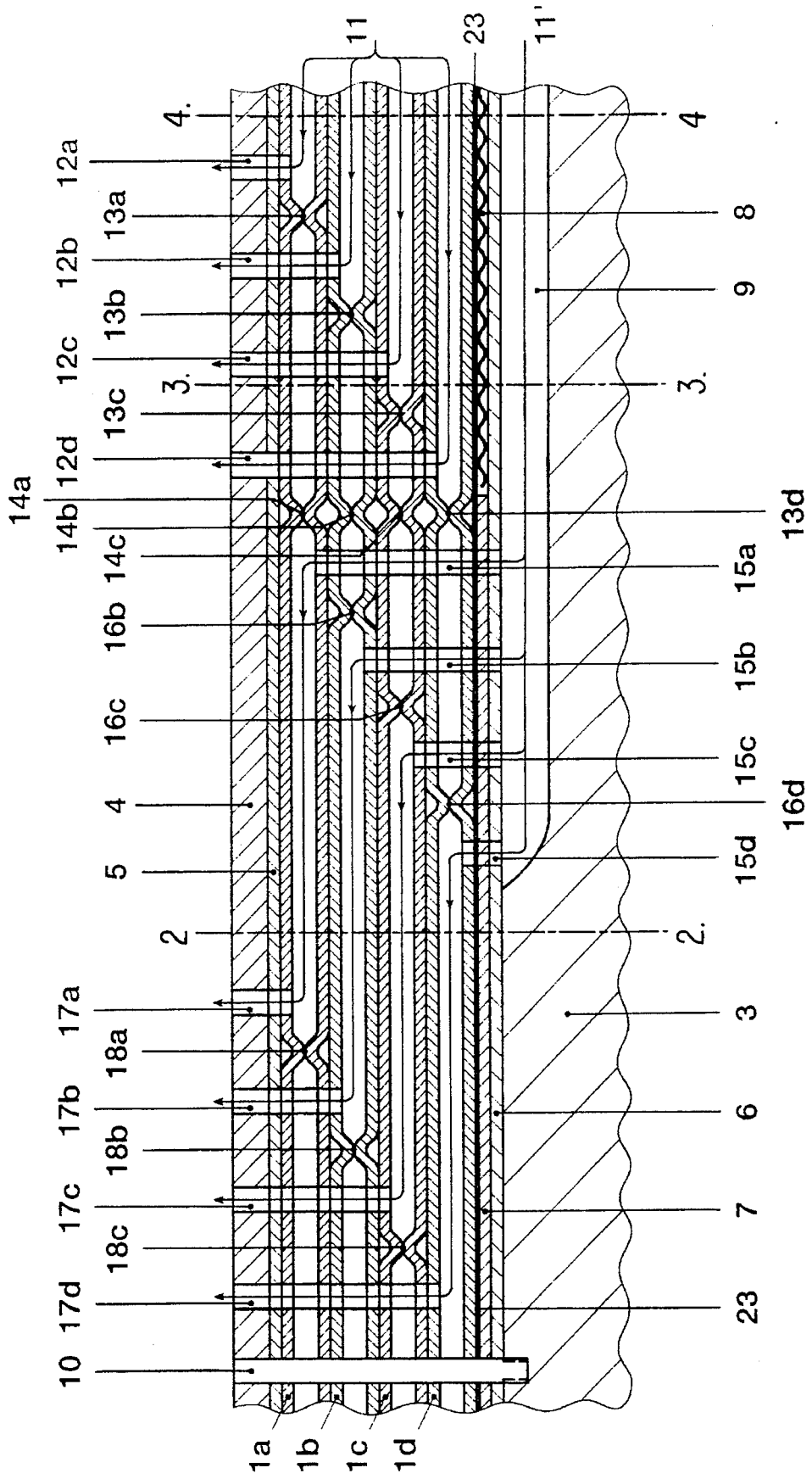
FIG. 1 shows a partial, simplified longitudinal section through the rotor of a turbogenerator, in order to explain the cooling gas supply.
Figure 2:
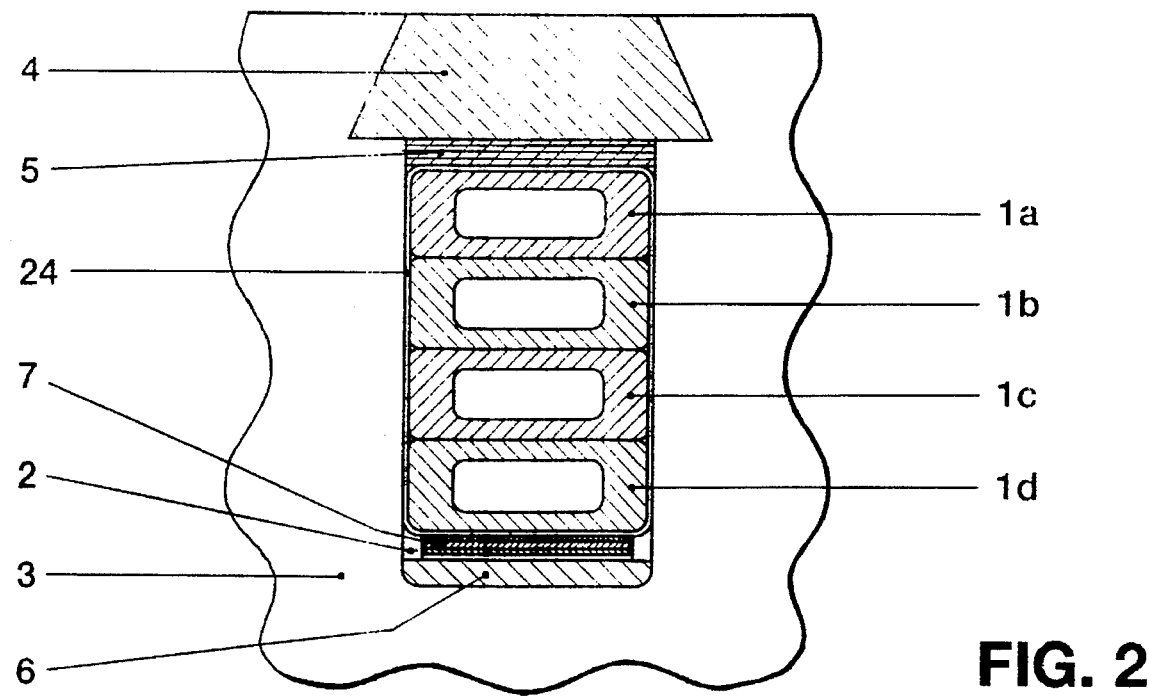
FIG. 2 shows a cross section through the rotor according to FIG. 1, along its line AA.

Referring now to the drawings, wherein like reference numerals designate identical or corresponding parts throughout the several views, in the partial, simplified longitudinal section through the central section of the rotor of a turbogenerator according to FIGS. 1 and 2, the excitation winding, which is constructed entirely from hollow conductors $1a$–$1d$, is arranged in slots 2 in the rotor body 3. For clarity of illustration, only four hollow conductors $1a$, $1b$, $1c$, $1d$, which are located radially one above the other, are illustrated in the example. The slot 2 is closed by a slot wedge 4. A wedge base 5 composed of an insulating material is located between the top hollow conductor $1a$ and the slot wedge 4. This wedge base may itself be resiliently elastic.

However, it may also be composed of a strip of insulating material and a separate resiliently elastic strip, for example a corrugated spring.

An insulating strip 6 is located in the slot base. This insulating strip 6 fills the slot 2 over its entire width and its underneath is matched to the shape of the slot. A filling strip 7, whose function will be explained later, is located between the insulating strip 6 and the bottom hollow conductor 1d.

Figure 3:
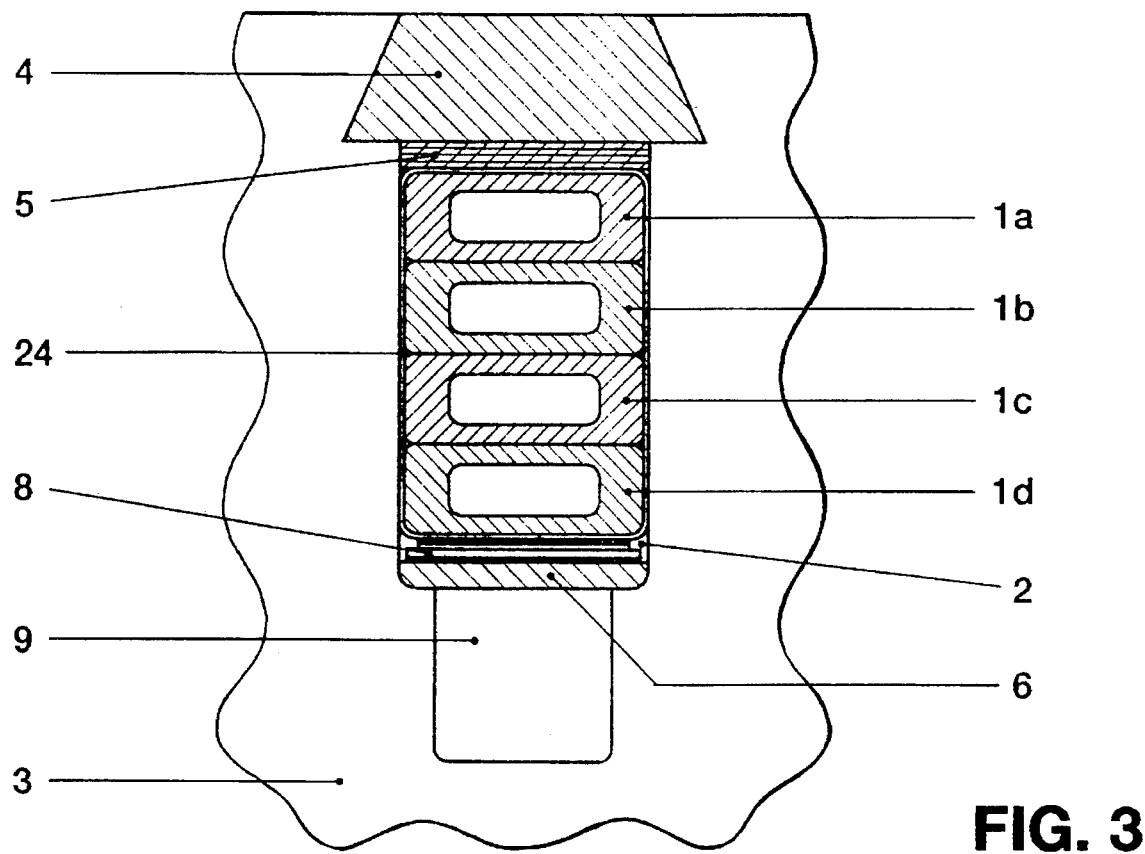
FIG. 3 shows a cross section through the rotor according to FIG. 1, along its line BB.
Figure 4:
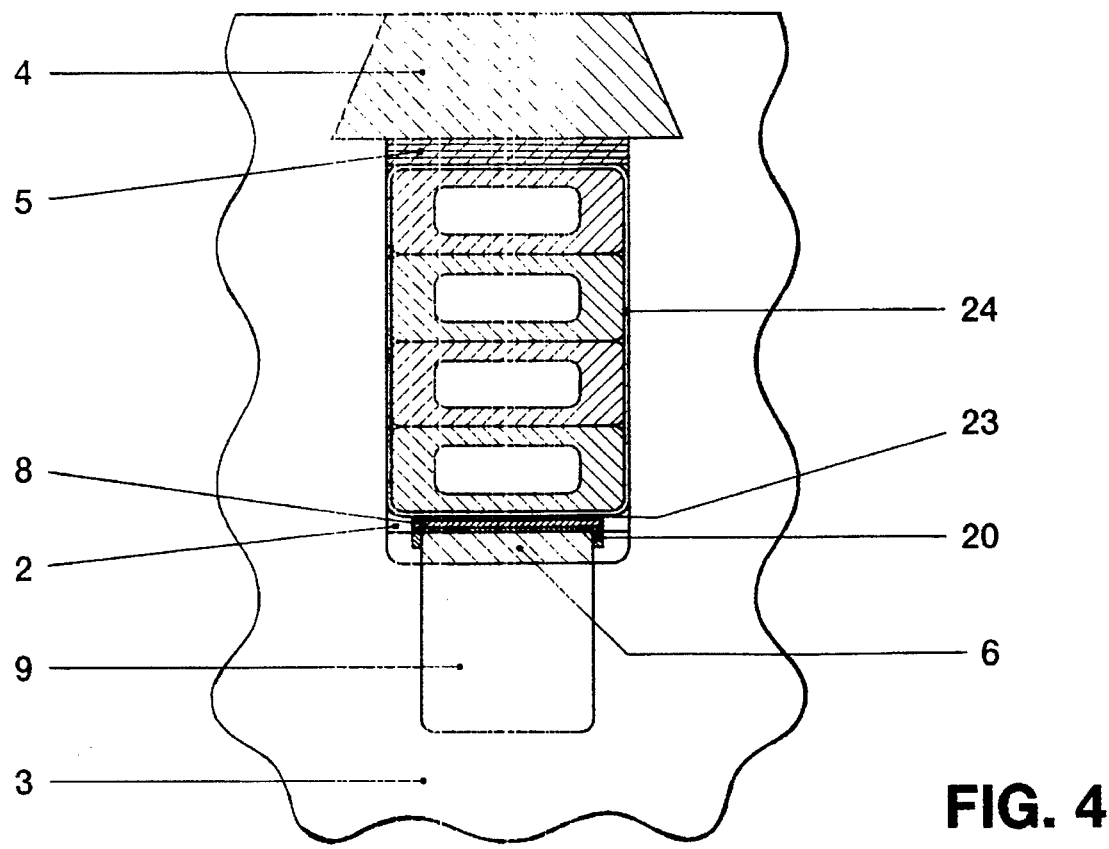
FIG. 4 shows a cross section through the rotor according to FIG. 1, along its line CC.
Figure 5:
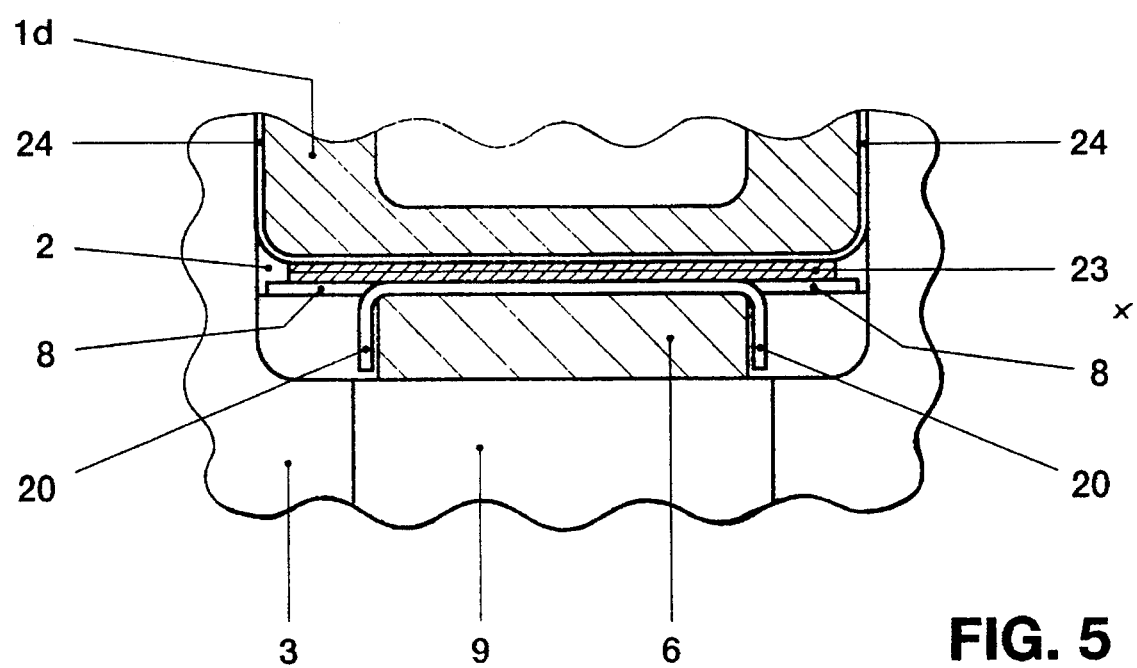
FIG. 5 shows an enlarged detail from FIG. 4.
Figure 6:
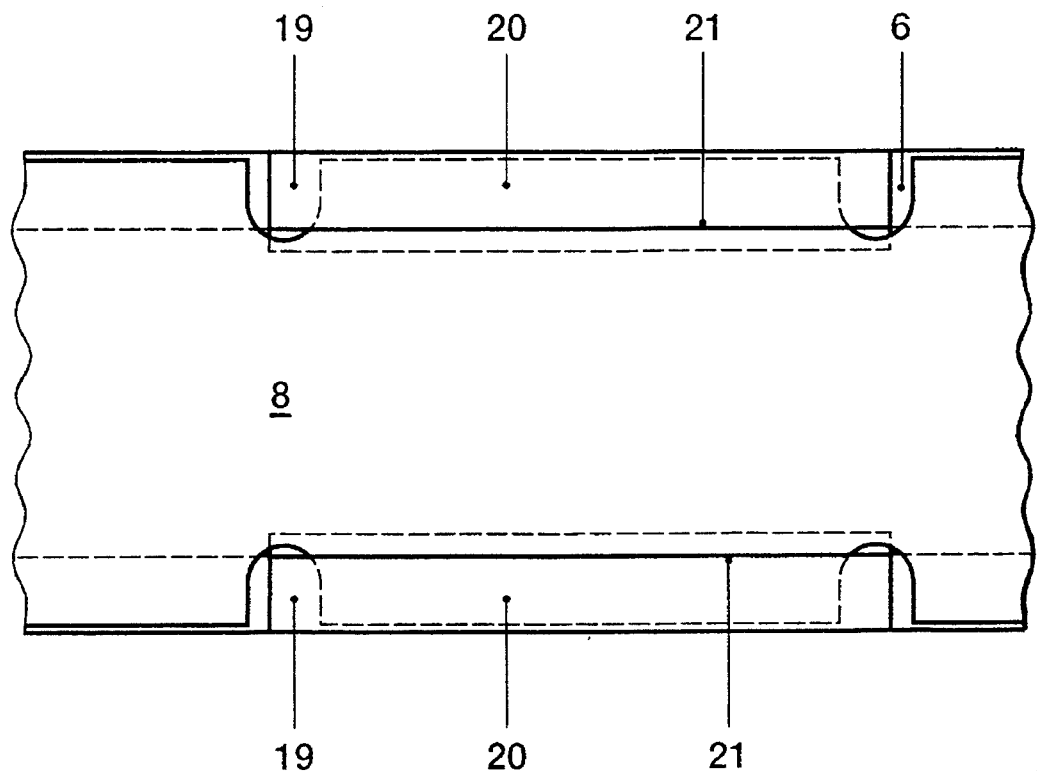
FIG. 6 shows a plan view of the insulating strip located in the slot base and of a corrugated spring, with the excitation conductors removed.

In the cross section, shown as a detail, through the end rotor section according to FIG. 3, a corrugated spring 8 is used instead of the filling strip 7. In this end section, the slot 2 has a channel-like depression, a keyway or subslot 9. Seen in the circumferential direction, this depression is narrower than the slot 2 which accommodates the hollow conductors 1a–1d. It extends from the rotor body start (which cannot be seen in FIG. 1) approximately over a quarter to a third of the entire rotor body length, and ends there. For reasons of clarity, the insulating strip 6, the filling strip 7 and the corrugated spring 8 are emphasized by being drawn in thick lines in FIGS. 1 to 3.

A bolt 10, which passes through all the hollow conductors, the slot wedge and the intermediate layers, is composed of an insulating material and is inserted into the rotor body 3 in the inner end, and is arranged in the rotor center. This bolt is used for axial fixing of the slot assembly.

The excitation winding is cooled in accordance with the cooling gas supply described initially and characterized there by method c).

A first cooling gas flow 11 passes from the (not illustrated) rotor winding overhang area through lateral slots (likewise not illustrated) into the hollow conductors 1a–1d therein and from there, distributed over a specific axial length, via radially running first channels 12a, 12b, 12c, 12d, which also pass through the wedge base 5 and the slot wedge 4, to the outside. These first radial channels are formed by through-holes in the hollow conductors 1a to 1d. In this case, the channel 12a is assigned to the hollow conductor 1a, the channel 12b to the hollow conductor 1b, the channel 12c to the hollow conductor 1c and the channel 12d to the hollow conductor 1d.

First obstructions 13a, 13b, 13c and 13d, which are formed by pinching the hollow conductors 1a, . . . , 1d, are provided, seen in the flow direction of the cooling gas, behind the first radial channels 12a, . . . , 12d. Second obstructions 14a, 14b, 14c are provided in the hollow conductors 1a, 1b and 1c respectively, seen in the flow direction of the cooling gas, behind the radial channels 12a–12d. These second obstructions, together with the obstruction 13d in the hollow conductor 1d, result in the first cooling gas flow emerging from the rotor in its end section and not being mixed with the second cooling gas flow 11', which is to be described in the following text and is supplied via the keyway 9 to the central rotor section.

The second cooling gas flow 11' passes from the keyway 9 into second radial channels 15a, 15b, 15c, 15d through holes both in the insulating strip 6, in the filling strip 7 and in the hollow conductors 1a–1d, into the individual hollow conductors. In this case, the channel 15a extends as far as the hollow conductor 1a, the channel 15b only as far as the hollow conductor 1b, the channel 15c as far as the hollow conductor 1c, and the channel 15d only as far as the hollow conductor 1d. In this case, third obstructions 16b, 16c, 16d are provided in the hollow conductors 1b, 1c and 1d respectively in order to avoid mixing of the individual partial gas flows.

The partial gas flows in the hollow conductors 1a to 1d are dissipated to the outside, close to the rotor body center (bolt 10), through third radial channels 17a, 17b, 17c and 17d. These third radial channels are also formed by radially running holes in the hollow conductors, the wedge base 5 and the slot wedge 4. Fourth obstructions 18a, 18b, 18c and the bolt 10 in this case ensure that the cooling gas emerges in an ordered fashion in the rotor body center.

FIGS. 3 to 7 now show in detail how the corrugated spring 8 is fixed axially in the slot base, above the keyway 9. To this end, the insulating strip 6 has two lateral recesses 19, whose depth corresponds approximately to the thickness of the insulating strip 6, in the vicinity of the rotor body end (right-hand drawing edge in FIG. 1), symmetrically with respect to its longitudinal axis. Instead of recesses 19, only slits of suitable length can also be provided. The corrugated spring 8 is manufactured from spring steel and is composed of a corrugated parallel strip, the corrugations being successive in the strip longitudinal direction. In the region of the recesses 19 in the insulating strip 6, the strip has on both sides a flap 20 which is bent downwards and whose bending edge is designated by 21 in FIG. 6. This flap is approximately as wide as the insulating strip is thick, that is to say it does not project downwards beyond the insulating strip 6.

Figure 7:
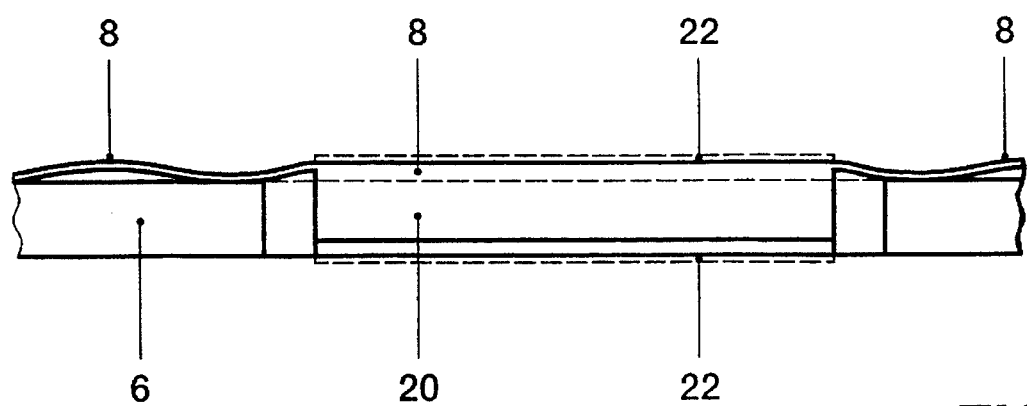
FIG. 7 shows a side view of the insulating strip and the corrugated spring.

In order to simplify assembly, a thin binding 22 composed of fiberglass impregnated with synthetic resin can be looped around the corrugated spring 8 and insulating strip—as is indicated by dashed lines in FIG. 7—at the location of the recess 19. A base 23 between the corrugated spring 8 and the bottom hollow conductor 1d prevents damage to the hollow conductor insulation 24.

The insulating strip 6 is axially secured by the shaping of the insulating strip 6, whose underneath is matched to the geometry of the slot base, in combination with the bolt 10. Those flaps 20 of the corrugated spring 8 which engage in the recesses 19 in turn secure the axial position of the corrugated spring 8 with respect to the insulating strip 6, and thus also the position of the corrugated spring with respect to the slot and with respect to the excitation winding. It is in this case sufficient to implement this securing only at the body end. If required, more than one pair of recesses 19 and associated flaps 20 can also be provided. These must then be located very closely adjacent to one another, seen in the slot longitudinal direction, in order that the corrugated spring 8 can extend.

It has been found that it is sufficient to arrange the corrugated spring 8 only at both rotor body ends, as is illustrated in FIG. 1, that is to say in the region between the body end and the second obstructions 14a, . . . , where no radial channels pass through the corrugated spring nor are able to impair its functioning.

The invention is, of course, not limited to rotors having an excitation winding composed of hollow excitation conductors through which flow passes essentially in the longitudinal direction and having a cooling layout according to FIG. 1. It can also be used for rotors without a keyway, that is to say for those rotors which are the subject-matter of EP-B-0 173 877. In addition, the resiliently elastic intermediate layer may be other than a corrugated spring.

As a glance at FIG. 1 of the initially mentioned US-A-4,152,610 shows, an insulating strip 6 is also used there as slot base insulation. In the case of the known excitation winding, although no resiliently elastic element is provided between the bottom excitation conductor and the insulating strip, and the direct gas cooling is also implemented in a different manner, the fixing according to the invention of a corrugated spring 8 on the insulating strip 6 can, nevertheless, also be used in the case of such an arrangement without departing from the context covered by the invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of The United States is:

1. A rotor of a turbogenerator having direct gas cooling of excitation winding conductors, the excitation winding conductors being arranged in longitudinal slots in a rotor body of the rotor and the longitudinal slots being closed by means of slot wedges, comprising:
   an insulating strip having lateral recesses provided between a base and the excitation winding conductors;
   a resiliently elastic intermediate layer in a form of a parallel strip provided between said insulating strip and said excitation winding conductors, wherein said resiliently elastic intermediate layer extends in a direction toward a center of the rotor body; and
   wherein the resiliently elastic intermediate layer has a pair of projections which point downwards and engage in the lateral recesses in the insulating strip.

2. The rotor as claimed in claim 1, wherein the projections are formed by bending an edge piece which is shorter in comparison to an overall length of the resiliently elastic intermediate layer.

3. The rotor as claimed in claim 1, wherein a radial height of the pair of projections which point downwards corresponds approximately to a thickness of the insulating strip.

4. The rotor as claimed in claim 1, wherein the rotor further comprises a keyway with a slot width, and a width of the insulating strip in a region of the lateral recesses corresponds approximately to the slot width of the keyway.

5. The rotor as claimed in claim 1, further comprising a binding provided in a region of the lateral recesses of the insulating strip, which binding is looped around the insulating strip and the resiliently elastic intermediate layer.

6. The rotor as claimed in claim 2, wherein a radial height of the pair of projections which point downwards corresponds approximately to a thickness of the insulating strip.

7. The rotor as claimed in claim 2, wherein the rotor further comprises a keyway with a slot width, and a width of the insulating strip in a region of the lateral recesses corresponds approximately to the slot width of the keyway.

8. The rotor as claimed in claim 3, wherein the rotor further comprises a keyway with a slot width, and a width of the insulating strip in a region of the lateral recesses corresponds approximately to the slot width of the keyway.

9. The rotor as claimed in claim 2, further comprising a binding provided in a region of the lateral recesses of the insulating strip, which binding is looped around the insulating strip and the resiliently elastic intermediate layer.

10. The rotor as claimed in claim 3, further comprising a binding provided in a region of the lateral recesses of the insulating strip, which binding is looped around the insulating strip and the resiliently elastic intermediate layer.

11. The rotor as claimed in claim 4, further comprising a binding provided in a region of the lateral recesses of the insulating strip, which binding is looped around the insulating strip and the resiliently elastic intermediate layer.

12. The rotor as claimed in claim 1, wherein the elastic intermediate layer comprises a corrugated spring.

* * * * *